Jan. 1, 1952  J. W. PAYNE  2,580,827
KILN FOR REGENERATING ABSORBENTS
Filed May 27, 1949  4 Sheets-Sheet 1

INVENTOR.
John W. Payne
BY
Charles A. Huggett
AGENT OR ATTORNEY

Jan. 1, 1952          J. W. PAYNE          2,580,827

KILN FOR REGENERATING ABSORBENTS

Filed May 27, 1949          4 Sheets-Sheet 2

INVENTOR.
John W. Payne
BY
Charles A. Huggett
AGENT OR ATTORNEY

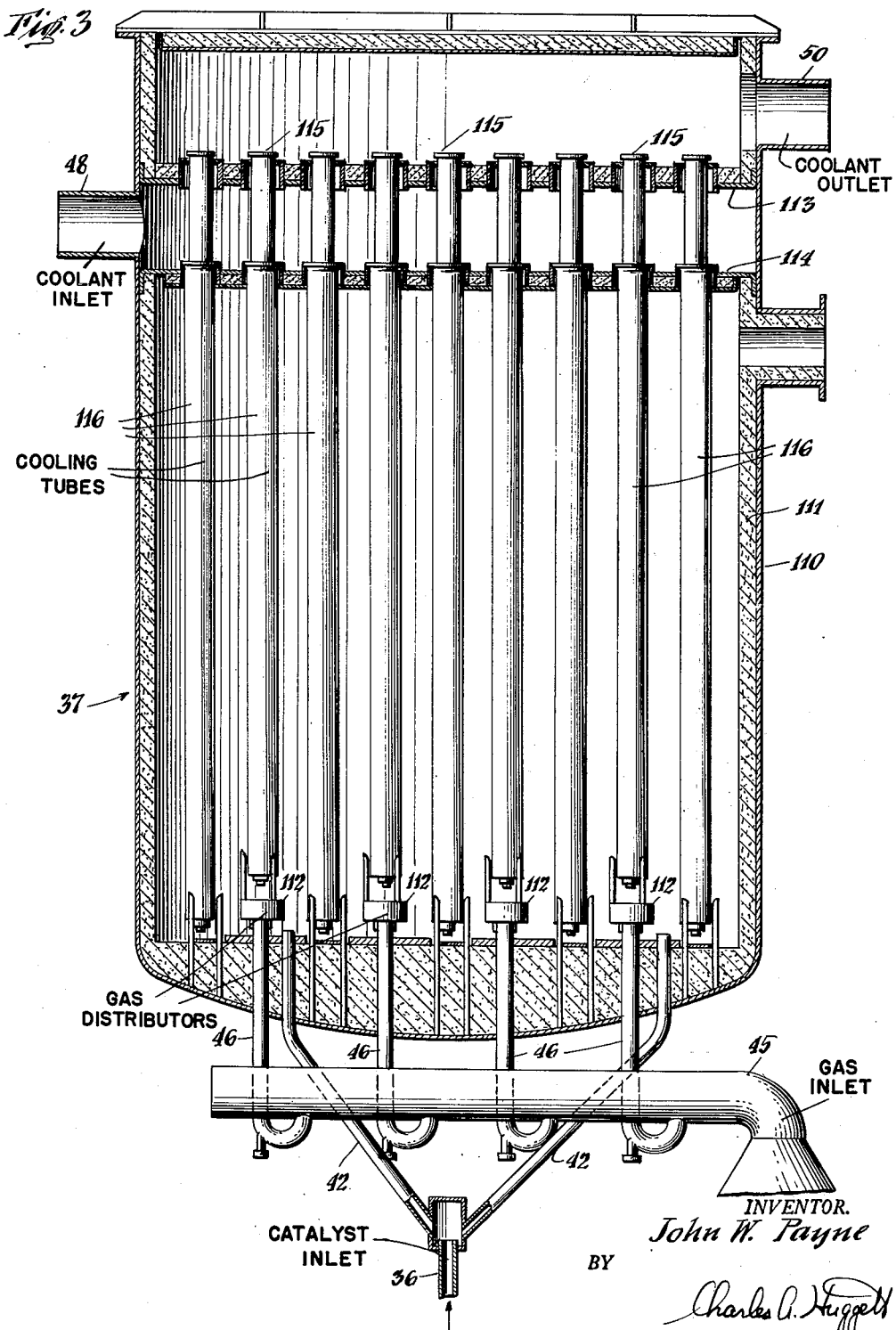

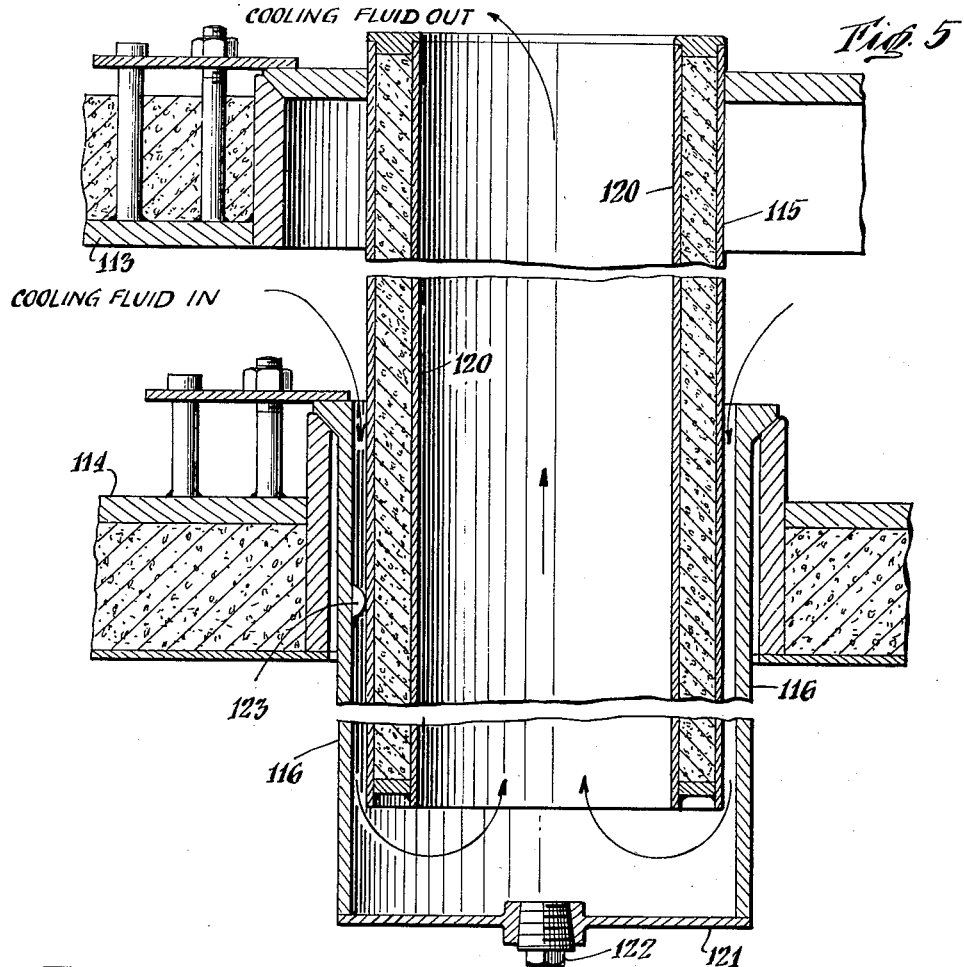
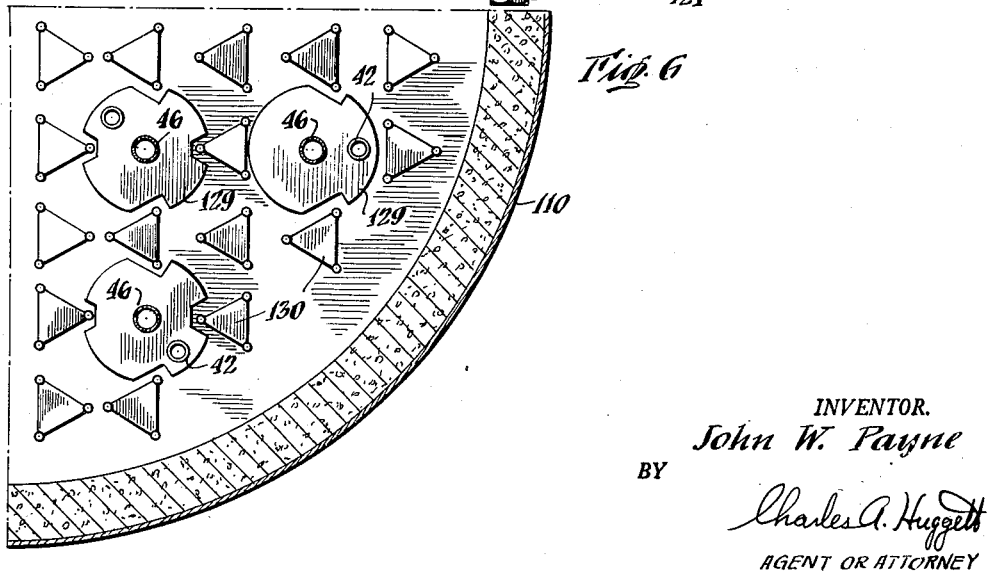

Patented Jan. 1, 1952

2,580,827

UNITED STATES PATENT OFFICE 2,580,827

KILN FOR REGENERATING ABSORBENTS

John W. Payne, Woodbury, N. J., assignor to Socony-Vacuum Oil Company, Incorporated, a corporation of New York Application May 27, 1949, Serial No. 95,713

2 Claims. (Cl. 23—288)

This application is directed to an improved process and apparatus for the continuous contacting of adsorbent powdered material with oils and refers more particularly to the continuous revivification of spent powdered adsorbent material which has been used for treating liquid oils.

An example of the type of process to which the invention appertains is the contact refining of lubricating oils to remove gum-forming compounds, color bodies and other objectionable material.

The material generally used as the pulverized or powdered adsorbent is clays such as fuller's earth, silica gels, bauxites, bentonite, montmorillonites, activated charcoal, and certain synthetic associations of silica and alumina to which other materials such as certain metallic oxides may be added. This material should be pulverized to a grain size which will pass through a 100 mesh Tyler screen and preferably within the range of about 150–400 mesh size.

In these contact filtration processes, the powdered material becomes fouled by the deposition of carbonaceous material and oily constituents upon its surface. By the use of solvents such as naphtha, low boiling alcohols and ketones, some of the contaminants can be removed, but the operation is too costly and inefficient to be considered commercially practical. The usual custom in this art is to subject the spent adsorbent material to a combination of steaming and naphtha washing to effect removal of the oily constituents from the adsorbent, after which the naphtha may be distilled off in a rotary drum kiln followed by burning of the contaminants in another mechanically driven kiln. This procedure has not proved satisfactory because of the high heat cost involved in distilling the naphtha from the adsorbent particles and because the efficiency of the adsorbent for treating oils was to a great extent lost in the burning regeneration. The latter difficulty is in large part due to the impossibility of providing adequate temperature control of the adsorbent by burning regeneration in rotary drum kilns and similar kilns employed commercially.

When it is attempted to regenerate this small-particle adsorbent material continuously in an enclosed vessel supported by fluidizing and combustion supporting gases, these same problems obtain. In addition, where the fluidizing flow is controlled to provide a dense phase region in the lower section of the regeneration vessel, and a light phase region located in the upper section of the vessel, afterburning in the light phase region presents an added problem. This phenomenon of afterburning, whereby localized burning in the light phase region occurs, causes permanent damage to the small-particle adsorbent material, rendering it useless for further contact filtering of lubricating oils. This effect can be controlled by extracting heat from the light phase region. One method of cooling the material in the light phase region is by injecting or spraying water or steam into the region. The contact material used in contact filtration processes is usually of such a nature, however, that contact with steam at the temperatures of regeneration cause permanent damage to the contact material, making this method undesirable.

A major object of this invention is the provision of an improved process and apparatus for revivifying finely divided adsorbent contact materials which have become spent by use in the contact treatment of liquid oils.

A further object of this invention is to provide an improved process and apparatus for continuous contact filtration of oils by providing adequate temperature control of the regeneration burning.

A further object of this invention is to prevent afterburning in the light phase region of the regeneration zone in which fluid-supported, particle-size contact material is being regenerated.

A further object of this invention is the prevention of afterburning in the light phase region of the regeneration zone in which fluid-supported, particle-size contact material, susceptible to permanent damage upon contact with steam, is being regenerated.

These and other objects of this invention will be made apparent by the following description read in view of the attached drawings, in which.

Figure 4:
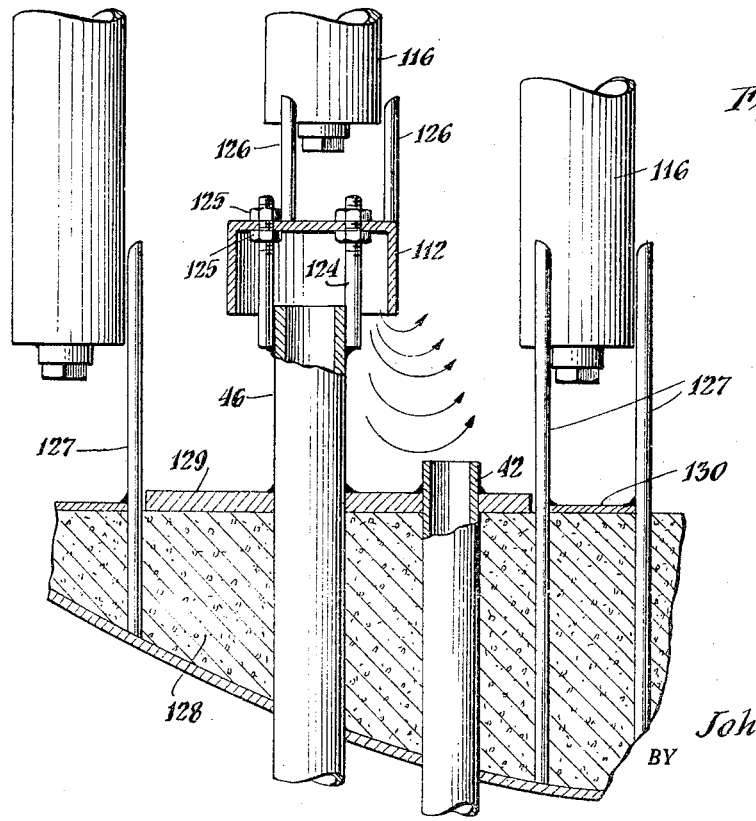

Figure 3 is a diagrammatic sketch in vertical elevation of the interior of the improved regeneration apparatus; and, Figure 4 is a diagrammatic sketch of the apparatus for introducing catalyst and gas into the improved regeneration apparatus; and, Figure 5 is a diagrammatic sketch showing in vertical section one of the groups of concentric cooling conduits used in the improved regeneration apparatus; and, Figure 6 is a quarter sectional plan view at plane 3—3 of Figure 3.

In the contact filtration of oils for decolorization, etc., such as the decoloriztion of petroleum oils, for example, pulverized contact material is admitted to a chamber containing the oil. The mixture is agitated to assure even distribution. The adsorbent particles pick up the objectionable material from the oil, and the filtered oil can be removed continuously from the chamber. When the particles of adsorbent become fouled to the extent that their filtering efficiency is reduced materially, they are removed from the chamber. The fouled contact material is passed through one or more solvent washing, and filtering steps, and is then admitted to apparatus shown in Figure 1, described herebelow.

Figure 1:
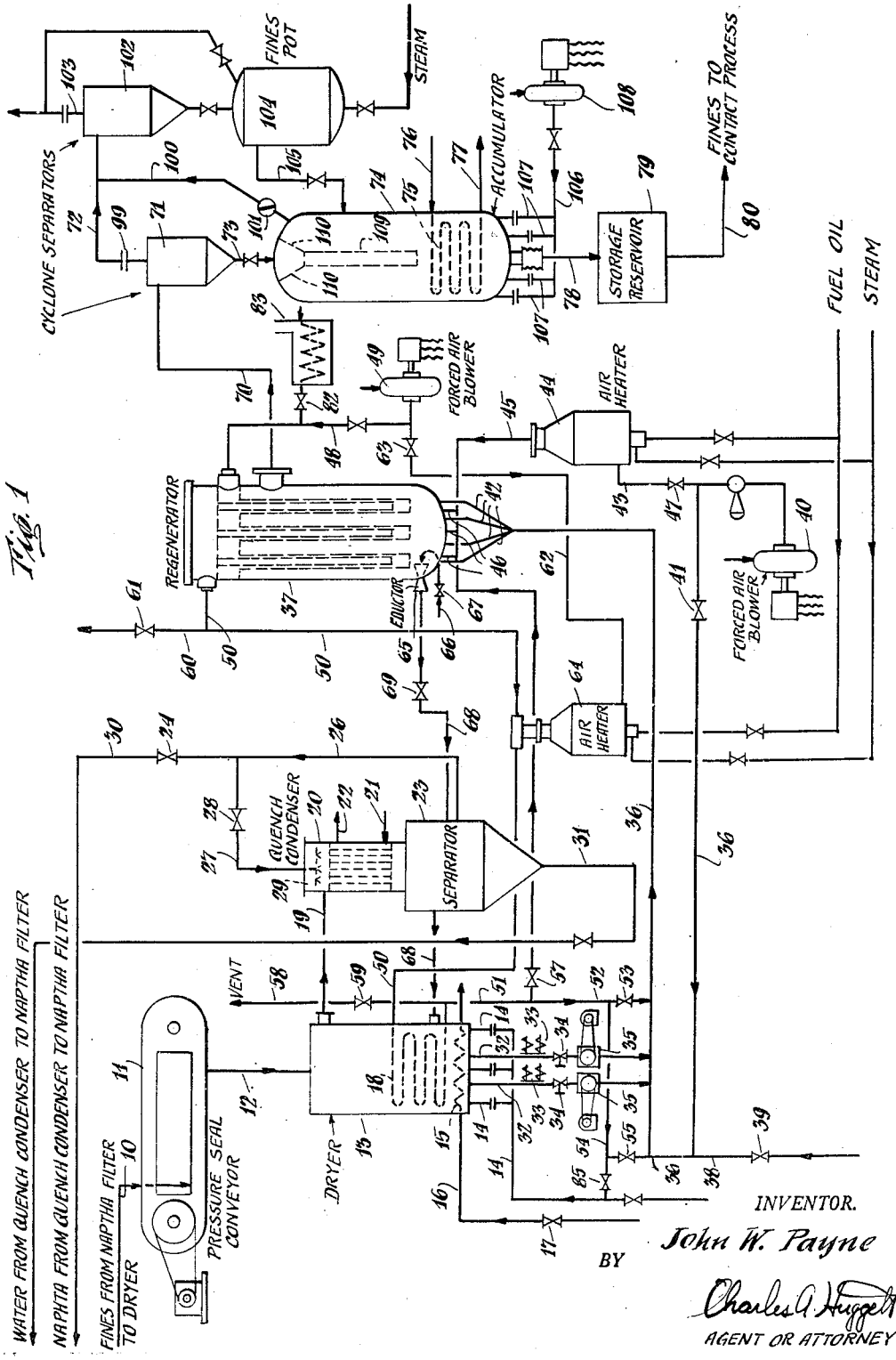
Figure 1 shows a schematic view, highly diagrammatic, of apparatus adapted to continuously revivify spent adsorbent material, fouled from use in a contact filtration process.

Referring now to Figure 1, contact material from the naphtha filter is passed through conduit 10 to the pressure seal conveyer 11. The conveyer, of the Redler type, permits the maintenance of a pressure differential between its entrance and exit and is readily adaptable to this contact filtration process, although other suitable conveyers are available.

The contact material is fed through conduit 12 from the conveyer 11 into the dryer 13. The dryer 13 may suitably be a vertically mounted vessel of circular cross-section. Steam is admitted to the lower section of dryer 13, through conduit 14 to maintain the contact material within the dryer in ebullient motion. The steam may be admitted to the dryer 13 through a multiplicity of conduits 14, suitably spaced across the bottom of the vessel to provide more even distribution as shown in Figure 1. Orifice means 15 may be installed in the conduits 14 to increase the velocity of the steam to provide better mixing in the dryer. The steam has a dual purpose in that in addition to providing support for the contact material, it acts as a stripping fluid, removing some of the more volatile materials from the contact material. Of course, the steam admitted to the dryer 13 through conduits 14 may be sufficiently hot to impart at least some of the heat to the contact material to volatilize some of the heavier oily constituents on the surface thereof. In addition, a heating coil 15 is located near the bottom of the dryer 13 to provide heat when desired. Steam is admitted through the coil 15 by means of the steam conduit 16, the amount being controlled by valve 17. But the major source of heat in the dryer in this invention is from the heating coils 18 located in the lower section of the dryer. The source of heat for the coils 18 will be described in detail hereinafter. The coils 18 may be coiled tubes or a bank of conduits, adapted to provide suitable heat transfer. The steam and vapors within the dryer may be removed from an outlet near the top thereof, and conducted through a conduit 19 to the quench condenser 20.

The quench condenser 20 is a vertically mounted vessel, which may be of circular cross section. The condenser 20 contains heat exchanger tubes and may be supplied with coolant fluid through conduit 21. The coolant is removed through the conduit 22. The heat exchanger may be of conventional vertical tube design with top and bottom headers and consequently is not described in detail. The coolant may suitably be water. The vapors removed from the dryer 18, admitted to the top of the quench condenser 20, pass downwardly through the condenser 20 and are cooled by contact with the exchanger tubes. The cooled vapors pass into a separator 23 located below the quench condenser, and communicating therewith. The vapors, converted to liquids by the cooling action of the condenser, settle in the bottom of the separator, which is constructed of larger cross section than the condenser to permit settling and separation to occur. The liquid level in the separator 23 may be controlled by operation of the valves 24 and 25 at a predetermined level, adequate to provide efficient separation. The naphtha, being lighter than the other material rises to the top and is removed through conduit 26. The naphtha may be recycled through conduit 27 controlled by valve 28 to the top of the quench condenser to permit better separation. The naphtha is sprayed into the top of the condenser 20 through nozzles, distributed across the vessel, to aid in the condensation and separation of the vapors removed from the dryer 13. The naphtha is thereafter removed to the naphtha filter for reuse through conduit 30, controlled by valve 24. The heavier liquids and solids which pass to the bottom of the separator 23 are withdrawn through conduit 31 and returned to the naphtha filter for further treatment.

The dried contact material is removed from the bottom of the dryer through the conduits 32, 32. Vibrators 33, 33 or other suitable means are installed in the outlet conduits 32, 32 to prevent packing or bridging of the contact material therein. The flow of material in conduits 32, 32 may be controlled by valves 34, 34, but is normally controlled by continuous feeders 35, 35 of the star valve type. The contact material is thereafter fed into conduit 36 for transmission to the regenerator 37. The contact material in conduit 36 is carried by a suitable lift gas, which may be steam or an inert gas admitted through conduit 38 controlled by valve 39. The lift gas can also be air admitted to the conduit by the blower 40, controlled by the valve 41. Steam cannot be used for certain contact materials, particularly useful in contact filtration processes, because the steam damages the material at the high temperatures encountered in the regenerator. It is, therefore, in most cases preferable to use gases other than steam in these processes.

The regenerator 37 is a vertically mounted vessel of circular, rectangular or other suitable cross section. The contact material supported by the lift gas is admitted to the bottom of the regenerator through a multiplicity of conduits 42, 42, located to distribute the material equally across the area of the vessel. An alternate or concomitant supply of combustion supporting gas is provided from blower 40 through the conduit 43. The gas is passed through a suitable air heater 44 and through conduit 45, to another group of entrance conduits 46, 46, also equally distributed across the bottom of the regenerator 37 to provide improved distribution. The gas flow in this line is controlled by valve 47.

The flow of combustion gas and/or lift gas is controlled to produce ebullient motion of the contact material within the regenerator 37. And further the flow is controlled to produce hindered settling of the contact material, producing a relatively dense fluid-like medium in the lower section of the vessel and enabling the material to remain in the vessel for the required contact time for suitable regeneration. Above the dense phase region is a light phase or less dense region of fluidized material through which the gases and material pass to the exit from the vessel. Within the regenerator are located heat exchanger tubes suitably located to provide adequate control of the regeneration temperature. These tubes pass through the light phase region and are so arranged that the cooling fluid passes through this region first. In this manner, sufficient heat is extracted from the light phase region to prevent afterburning. By this means, afterburning in the light phase region is controlled without injecting steam or water into this region. As previously indicated, it is not desirable to introduce steam or water into this region because the contact material used in this process would be permanently damaged thereby.

Cooling air for the exchanger tubes is admitted to the regenerator 37 through conduit 48, by an appropriate blower 49 and removed from the regenerator through the conduit 50. The hot air exhausted from the regenerator heat exchanger through the conduit 50 is admitted to the exchanger 18 in the dryer to provide heat for the drying operation. The excess heat generated during the burning of the carbonaceous material from the surface of the contact material, in the regenerator, is thus conveniently supplied to the dryer 18 to produce satisfactory drying temperature. The air leaving the regenerator heat exchanger may be approximately 1000° F., and this may be reduced to approximately 500° F. in the dryer exchanger. The air may then be conducted to the regenerator for combustion purposes, being in a suitably preheated condition. This may be done by admitting the air through conduits 51, and 52 to conduit 36, controlled by valve 53. It may be desirable, however, to mix the preheated air with the lift gas prior to the admission of the contact material thereto. This can be done by passing the air through conduit 54 controlled by valve 55. Or it may be more expeditious to convey the gas through the conduit 56 to the conduits 46. The flow of preheated air in conduit 56 may be controlled by the valve 57 incorporated therein. Excess preheated air not used in the regeneration may be vented from the system through the conduit 58, controlled by the valve 59. Another vent conduit 60 is provided in the conduit 50 to permit the diversion of at least some of the hot air prior to its passage through the dryer 18. This vent is controlled by the valve 61.

If a greater supply of hot air is needed in the dryer exchanger 18, without disturbing the heat balance in the regenerator 37, it may be provided from the blower 49 through the conduit 62. The flow in the conduit 62 is controlled by the valve 63, located therein. This air is conducted to a suitable air heater 64 to heat the air to the predetermined temperature, and then injected into the conduit 50 to intermingle with the hot air being conveyed from the regenerator exchanger to the dryer exchanger. These air heaters 46, 64 may be heated by the combustion of any suitable fuel available, such as, for example, fuel oil in a conventional manner, not described. The steam is injected to atomize the fuel oil.

Within the regenerator 37 the contact material, maintained in ebullient motion, is kept within a suitable regeneration temperature range permitting rapid regeneration, without damage from overheating. A portion of the hot regenerated contact material may be withdrawn from the regenerator 37 through the eductor 65. The flow through the eductor 65 may be controlled by the carrier gas admitted to the eductor through the conduit 66, controlled by the valve 67. This contact material is conveyed through the conduit 68 by the flow of carrier gas, to the dryer 13. Thus, the hot contact material may be used to transfer heat to the dryer during the starting operation. Flow may be controlled in conduit 68 by valve 69.

The major portion of the regenerated contact material is removed from the regenerator 37 through the conduit 70, located near the top thereof. The contact material is conducted to a separator 71 in which the gas is taken overhead through conduit 72, and the contact material is removed from the bottom through conduit 73 to an accumulator 74.

In the accumulator, a vertically mounted vessel is located a heat exchanger 75, adapted to cool the contact material. The exchanger 75 is supplied with coolant fluid through conduit 76, and the coolant fluid is removed therefrom through conduit 77. The exchanger may be of conventional design, and is not described in detail.

The cooled contact material is removed from the bottom of the accumulator through the conduit 78 to a storage reservoir 79. The contact material is thereafter removed from the reservoir when needed through conduit 80 for use in the contact filtration process of removing color bodies from lubricating oils.

It is sometimes more expedient to use steam as the coolant fluid in the regenerator heat exchanger than air. This can be accomplished readily by closing the valve 81 in conduit 48 and opening valve 82, thereby excluding air and admitting steam. The steam may be generated in a suitable furnace 83, in which steam coils are located. The steam, in turn, may be used in the dryer exchanger 18, similar to the use of the hot air, to provide the heat for drying the contact material. The waste steam can then be admitted to conduit 14 from conduit 54 by opening the valve 85, and then used in the dryer 13 as the stripping fluid.

Figure 2:
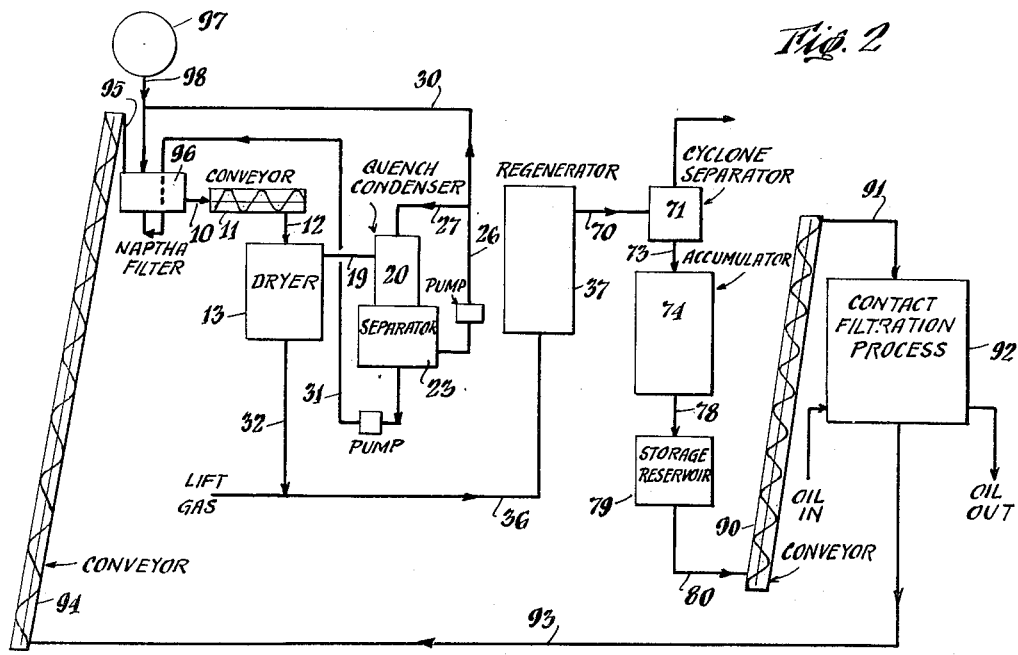
Figure 2 is a diagrammatic sketch, showing the relationship of the elements of a continuous contact filtration process, the elements being represented in block form.

Referring now to Figure 2, the sequence of the steps of a complete contact filtration process is shown with each major element indicated in block diagrammatic form. From the naphtha filter 96, the contact material is passed to the conveyer 11 through the conduit 10. From the conveyer 11, the material is passed to the dryer 13 through the conduit 12 as previously indicated. The material from the drier 13 is introduced into conduit 36 through the conduit 32, where it is carried by the lift gas to the bottom of the regenerator 37. As previously described, the contact material after regeneration is conducted through conduit 70 to the cyclone separator 71 wherein it separates from the gas and is removed from the bottom thereof. The contact material is then admitted to the accumulator 74 via the conduit 73 and is removed from the bottom thereof through conduit 78 to a storage reservoir 79. From this reservoir, the material is taken through conduit 80, conveyor 90, and conduit 91 to the contact filtration process. This entire process, represented by the single block 92, may be a contact filtration process of lubricating oil to remove color bodies from the oil, found objectionable for lubricating purposes. The fouled contact material from this process is transferred through conduit 93, conveyer 94, and conduit 95 to the naphtha filter 96.

A small portion of the fines from the dryer 13 are entrained in the vapors leaving the dryer 13 through the conduit 19. They fall to the bottom of the separator 23, forming a slurry with the condensed water. The slurry is pumped through the conduit 31 to the bottom of the naphtha filter 96. As previously described, the separated naphtha is removed from the separator 23 through conduit 26 and a portion is recycled to the condenser 20 through the conduit 27. The remainder is conducted to the top of the naphtha filter 96 through the conduit 30. Additional naphtha may be added from tank 97 through the conduit 98. As the drum filter rotates, the fines are removed from the slurry as a cake on filtering medium, and the excess water is withdrawn from the filter 96. The wet cake is washed by the naphtha and then removed from the filter 96 through conduit 10, conveyer 11, and conduit 12 to the dryer 13.

Certain difficulties arise in connection with the disengagement of the gas from the solid contact material after the removal from the regenerator 37. One way of overcoming these difficulties is shown on Figure 1. A restriction 99 is placed in the outlet gas conduit of the separator 71 sufficient to force a small quantity of gas down through conduit 73 to flush this conduit of piled contact material. The gas escapes from the accumulator through the conduit 100, controlled by damper 101 located therein. The gases pass to a second cyclone separator 102. The gases pass overhead through the conduit 103, and the contact material is removed from the bottom thereof to a fines pot. Steam or other inert gas is admitted to the bottom of the fines pot 104 to pick up the contact fines and carry them through the conduit 105 to the accumulator 74.

A low flow of aerating gas is admitted to the bottom of the accumulator 75 through conduit 106 and conduits 107 from the air blower 108. The contact material is maintained in the bottom of the accumulator in the form of a dense bed because of the low gas flow. The upper portion of the accumulator is practically free of particle-form material. To prevent material entering the accumulator through the conduit 73 from exiting with the gas through conduit 100, the suspended vertical tube 109 open at both ends is mounted within the accumulator, located directly under the entrance. The tube 109 is suspended by rods 110 to provide an opening between the top of the tube 109 and the upper interior of the accumulator. The tube aids in directing the contact material to the dense bed in the lower portion of the accumulator to prevent loss of said contact material.

Referring now to Figure 3, the interior of the regenerator 37 is shown, illustrating the interior construction in greater detail. The outer shell 110 of the regenerator 37 has an inner layer of insulation 111 which covers the interior surface of the vessel. The inlet conduits 42 pass upwardly through the bottom of the shell 110 and insulation 111. The outlets of these conduits are substantially equally distributed across the bottom interior of the regenerator 37. This provides equalized distribution of the contact material and gases to prevent the production of dense streams through the vessel. And further this apparatus provides better mixing, particularly at the bottom of the vessel, thereby providing a more uniform temperature control of the regenerating contact material, and more complete regeneration in the lower section of the vessel. The combustion supporting gas is admitted to the vessel through conduit 45 and individual conduits 46, having outlets near the bottom of the regenerator and substantially equally distributed across the bottom interior of the regenerator 37. The outlets have caps 112 located over the outlets so disposed to permit the combustion supporting gas to flow therefrom in such a way that the gas is dispersed and mixed with the other gas and contact material near the bottom of the regenerator 37.

Near the top of the interior of the regenerator is located a horizontal plate 113 forming a partition in the vessel. A second horizontal plate 114, similar to the first, is located a spaced distance below the first plate 113. A multiplicity of tubes 115 depend from the first plate 113 at locations equally distributed across the cross section of the vessel, and larger diameter tubes 116, surrounding the major portion of these tubes depend from the second plate 114. The outer tubes 116 are sealed at the bottom.

As previously described, the cooling fluid is admitted to the regenerator 37 through the conduit 48 to the space in the vessel formed by the two plates. The fluid then is transmitted downwardly through the space between the inner and outer tubes to the bottom of the inner tubes. The then heated fluids pass through the open end of the inner tubes 115 upwardly to the space within the vessel above the first plate 113 and from the vessel through the conduit 50.

The construction of the depending tubes is shown more clearly on Figure 5. The inner tube is formed by two concentric tubes of equal length. The space between these tubes 120, 115 may be filled with insulating material and sealed at both ends. A small annular space is provided between the tubes 115, 116 to permit the downward flow of cooling fluid in substantially streamlined flow. The outer tube 116 extends to a location just above the bottom of the regenerator, and it is closed at the bottom by the disc 121. A plug 122 in the disc 121 is removable for inspection and cleaning of the tubes. The fluid passes upwardly through the innermost tube 120. The insulation material between the tubes 120, 150 serves to keep the mean temperature differential between the cooling fluid passing downwardly between the tubes 115, 116 and interior of the regeneration vessel at a maximum value, thereby providing a more uniform temperature within the vessel, and further providing a more sensitive control of that temperature. The insulation material above the upper plate 113 and below the lower plate 114 is installed to serve the same purpose. And by keeping the mean temperature differential high, in the light phase region particularly, afterburning is avoided. The guide lugs 123, being three or more in number, are located around the inner periphery of the outermost tube 116 to maintain the inner tubes concentrically aligned, thereby providing equal distribution of the cooling fluid in the space between the tubes 115, 116.

Figure 4 shows the lower end of the depending tubes 116. The detail of the caps 112 located over the pipes 46 is sectioned for clarity. The bolts 124 are welded to the pipes 46, and the distance of the cap 112 above the outlet of the pipe 46 can be adjusted by adjusting the nuts 125, to obtain the desired flow from the conduits and turbulence within the regenerator 37. The guide members 126, attached to the cap 112, are designed to position the lower ends of the depending tubes 116. Similar guide members 127, attached to the bottom of the regenerator 37, are located below those tubes 116 which do not have inlet conduits 46 positioned therebelow.

The insulating material 128, which may be insulating concrete, serves as a bottom of the interior of the vessel 37. Surrounding the inlet conduits 46, above the insulating material 128, are located protecting plates 129. The catalyst supported by lift gas is admitted to the vessel 37 through conduits 42 into the space between the tubes 116. By admitting only air through the conduits 46, erosion of the metal is avoided, and further considerable catalyst attrition is also avoided. If the catalyst were admitted below tubes 116, erosion of the bottoms of these tubes would result, necessitating frequent repair. By properly adjusting the previously described caps 112, the air can be made to deflect laterally in the vessel, passing down to the protecting plates 129, and then mixing with the catalyst issuing from the conduits 42. This results in greatly improved mixing of the catalyst and air at the bottom of the vessel, which provides vastly improved control of the regeneration of the catalyst, permitting rapid revivification without damage to the catalyst. In addition, the revivification is completed in the dense phase region in the lower section of the regenerator 37. When the contact material and gases pass through the light phase region in the upper section of the vessel, therefore, there is materially less possibility of afterburning occuring. The caps 112, further, prevent the contact material from being projected against the bottom of the tubes with consequent erosion of metal and attrition of contact material. The protecting plates 129, previously described, serve a similar purpose in preventing erosion of the insulating concrete base of the vessel.

Figure 6 is a quarter section of Figure 3 through the plane 3—3, showing in detail the bottom of the reaction vessel 37. The arrangement of the protecting plates 129, inlet conduits 46, and catalyst inlet conduits 42 is shown. The protecting plates 129 are notched at certain locations as shown, to permit triangular plates 130 to be installed to connect the guide members 127 in order to strengthen the guide structure. The guide members 127 are welded to the corners of the triangular plates 130. These plates 130 are also shown on Figure 4.

The invention as described above is not intended to be limited thereby but only by the following claims.

What is claimed is:

1. Apparatus for continuously regenerating adsorbent contact material of small particle size which has become deactivated by liquid phase contact with an oil in a treating process followed by solvent stripping of oily constituents and drying of stripped material comprising: a vertical vessel, a first horizontal plate within said vessel located near the top, a second horizontal plate located a spaced distance below said first plate, a multiplicity of tubes depending from said plates arranged in concentric groups equally distributed across the cross-section of the vessel, each group comprising an inner tube depending from said first plate and an outer tube depending from said second plate, said outer tube extending below said inner tube and being sealed at the bottom, said tubes extending to a location near the bottom of said vessel, inlet conduit means located in the side wall of said vessel between the first and second plates, outlet conduit means located in the wall of said vessel above said first plate, a second outlet conduit means located in the wall of said vessel spaced below said second plate, a multiplicity of inlet conduits distributed across the bottom of said vessel adapted to introduce suspended catalyst into the vessel in a vertical direction in the space between said vertical tube groups, a second multiplicity of inlet conduits distributed across the bottom of said vessel through which gases may be introduced into said vessel in a vertical direction, caps located a spaced distance above said second multiplicity of inlet conduits adapted to deflect said gases in a laterally downward direction, protection plates located around said second multiplicity of inlet conduits adapted to redeflect the gases in a laterally upward direction, whereby said gases and suspended catalyst are more intimately mixed in the lower section of said vessel.

2. In combination in a vertical vessel, a first inlet conduit projected through the bottom of said vessel in a vertical direction for the introduction of fluid supported particle-form material, a second inlet conduit projected through the bottom of said vessel in a vertical direction for the introduction of fluids into said vessel, a protecting plate surrounding said conduits located on the bottom interior of said vessel, vertical rods attached to the end of said second inlet conduit, said rods projected upwardly and threaded at their upper ends, a cap positioned by said rods over the outlet of said second inlet conduit, said cap adapted to be moved vertically on said rods to adjust the direction of flow of said fluids admitted through said second inlet conduit to a desired lateral direction whereby said fluids can be intimately mixed with said fluid supported particle-form materials in the bottom portion of said vessel.

JOHN W. PAYNE.

REFERENCES CITED

The following references are of record in the file of this patent:

UNITED STATES PATENTS

| Number | Name | Date |
| --- | --- | --- |
| 2,367,351 | Hemminger | Jan. 16, 1945 |
| 2,386,491 | McOmil | Oct. 9, 1945 |
| 2,394,651 | Alther | Feb. 12, 1946 |
| 2,406,555 | Martin | Aug. 27, 1946 |
| 2,433,798 | Voorhees | Dec. 30, 1947 |
| 2,436,486 | Scheineman | Feb. 24, 1948 |
| 2,453,740 | Becker | Nov. 16, 1948 |

FOREIGN PATENTS

| Number | Country | Date |
| --- | --- | --- |
| 122,563 | Great Britain | Jan. 30, 1919 |